Patented Feb. 20, 1923.

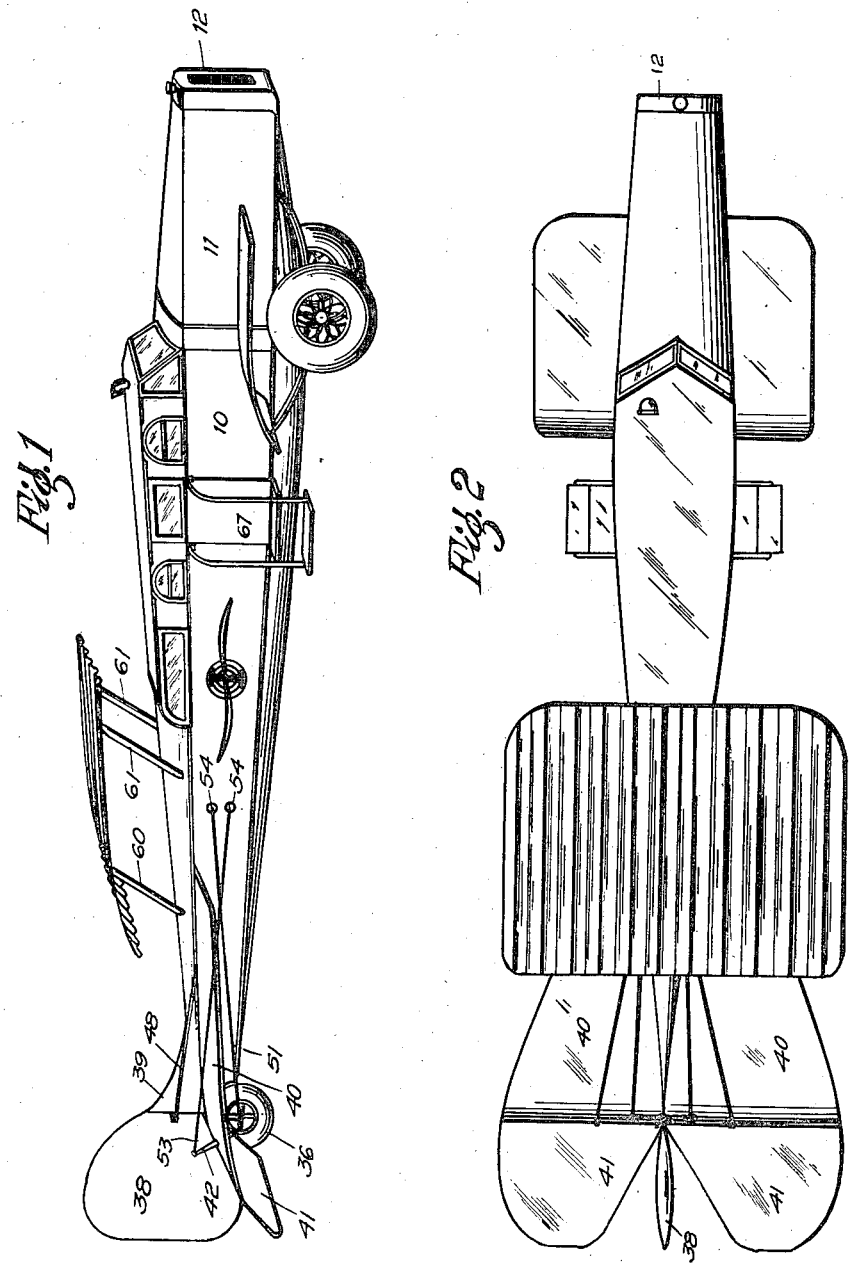

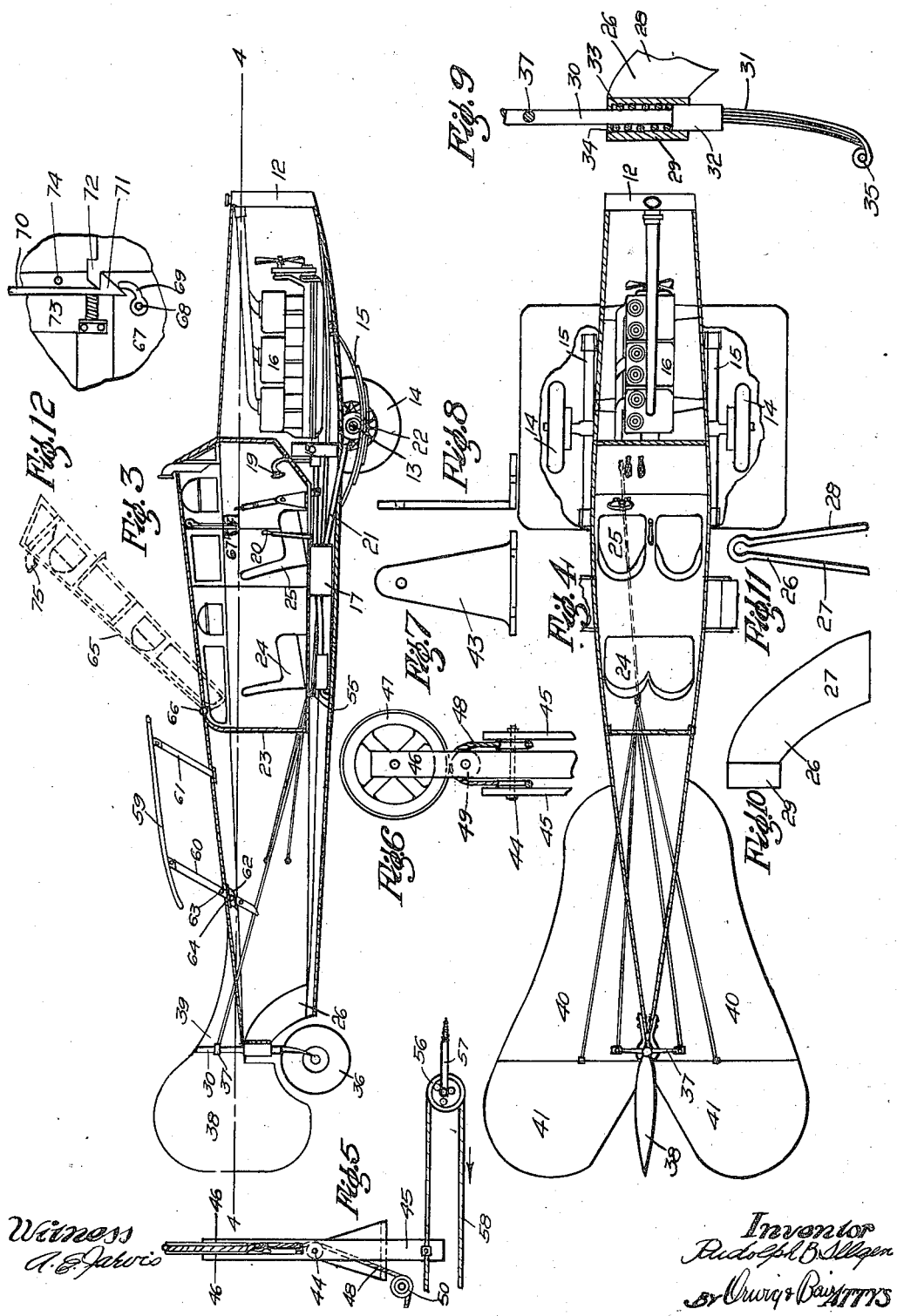

1,445,953

UNITED STATES PATENT OFFICE.

RUDOLPH B. ILLGEN, OF DES MOINES, IOWA.

AUTOPLANE.

Application filed January 2, 1920. Serial No. 349,047.

*To all whom it may concern:*

Be it known that I, RUDOLPH B. ILLGEN, a citizen of the United States, and resident of Des Moines, in the county of Polk and State of Iowa, have invented a certain new and useful Autoplane, of which the following is a specification.

The object of my invention is to provide an auto-plane of simple, durable and inexpensive construction.

More particularly it is my object to provide a combined aeroplane and automobile which is so designed that it secures the advantages of both aeroplane and automobile transportation.

A further object of my invention is to provide an auto-plane designed to present the impression of being constructed along the lines of an aeroplane, which also may be driven and controlled as an automobile is driven and controlled.

Still a further object of my invention is to provide a combined structure designed in accordance with the design of a fuselage of an aeroplane and provided with ground wheels whereby the device may be driven and steered over the ground, in combination with planes and rudders whereby the device may be partially carried and steered by the resistance of the air.

Still a further object of my invention is to provide a fuselage structure mounted upon power driven wheels at the forward portion of the fuselage, while the rear portion of the fuselage is either carried by a steerable ground wheel or lifted from the ground by the resistance of the air against the planes, due to the forward motion of the machine, and steered by an aeroplane rudder.

Still a further object is to provide means whereby the steering wheel and rudder may be simultaneously controlled so that the machine may be steered whether the rear end is being carried by the ground wheel or supported by the air.

Still a further object of my invention is to provide an adjustable plane designed to control the lift exerted against the rear end of the body relative to the speed of the machine, so that little effort may be required of the operator to control the elevation of the rear portion of the device.

Still a further object of my invention is to provide a transmission gearing and connection such that the engines, clutch and transmission mechanism now in general use in automobiles may be used, with but little change, for driving my improved machine.

Still a further object is to provide a movable cover member for the fuselage structure, designed to permit ready entry into the fuselage, and which may be readily moved to position to protect the driver of the machine.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of my improved device.

Figure 2 shows a top or plan view of the same.

Figure 3 shows a vertical, central, sectional view.

Figure 4 shows a horizontal sectional view through the fuselage of the device, taken on the line 4—4 of Figure 3.

Figure 5 shows a detail view of the elevating and steering controlling mechanism.

Figure 6 shows a detail view of a portion of the parts shown in Figure 5.

Figure 7 shows a side elevation of the supporting bracket for the controlling device shown in Figure 5.

Figure 8 is an end elevation of the parts shown in Figure 7.

Figure 9 is a detail view, parts being shown in section, of the spring fork in which the rear wheel is mounted.

Figure 10 is a side elevation of the bracket which supports the rear wheel.

Figure 11 is a top or plan view of the parts shown in Figure 10; and

Figure 12 is a detail of a latching device for the cover of my machine.

Referring to the accompanying drawings, I have used the reference numeral 10 to indicate generally the body or fuselage of my device, which is provided with a hood 11 and radiator 12 at the forward end thereof. The fuselage 10 comprises an elongated body having its greatest cross-sectional area slightly forward of the central portion thereof, and the remaining portion of the body is stream line or contracted toward the ends.

Adjacent to the forward end of the body 10 an axle 13 is supported by means of wheels 14, and carries the weight of the body structure on suitable springs 15.

Above the axle 13 and somewhat forward thereof, an internal combustion engine 16, of any suitable type, is mounted, and the drive shaft thereof extends rearwardly to the transmission housing 17. A clutch device 18, controlled by a pedal 19 of ordinary construction, is provided. The transmission gearing is similar to that used in automobiles, and is controlled by a lever 20 to regulate the relative speed of the drive shaft and the engine. A drive shaft 21 extends from the transmission gearing 17 to the axle 13, and is suitable connected thereto as by means of a differential 22.

Mounted within the fuselage, rearwardly of the engine 16 and the axle 13, is a cabin 23, in which are mounted seats 24 and 25, the latter being designed to be occupied by the operator of the machine.

At the rear end of the fuselage an upwardly and rearwardly inclined bracket 26 is provided, having forked ends 27 and 28 designed to receive and be secured to the rear end of the fuselage.

At the rear end of the bracket 26 a bearing member 29 is provided, designed to receive a shaft 30 which is connected to a pair of spring forks 31. The shaft 30 is provided with an enlarged portion 32 designed to coact with a spring 33 and a flange 34 in the bearing 29 to permit vertical reciprocation of the shaft 30 against the yielding resistance of the spring 33.

The spring forks 31 have a bearing 35 at the lower end thereof, designed to receive a wheel 36.

A transverse rod 37 is fixed adjacent to the upper end of the shaft 30, and projects laterally in either direction from the shaft.

Above the bearing 29 a rudder 38 is also fixed to the shaft 30, and extends rearwardly therefrom.

Forwardly from the shaft 30 and above the body 10, a tail plane 39 is mounted. On either side of the tail plane 39 horizontal fins 40 extend laterally from the body 10 and are preferably inclined downwardly and rearwardly. At the rear end of the horizontal fins 40 elevators 41 are pivoted thereto on a horizontal axis. A pylon or king post 42 is secured to each of the elevators 41, and extends vertically in either direction therefrom.

Within the cabin, adjacent to the operator's seat 25, brackets 43 are secured to the floor of the cabin and extend upwardly therefrom. The brackets 43 have a shaft 44 extended therebetween adjacent to their upper ends, and a lever or joy stick 45 is pivotally mounted on the shaft 44.

At the upper end of the lever 45 spaced brackets 46 pivotally support a steering wheel 47 which has its axis parallel to the longitudinal axis of the body.

A control wire or cable 48 is extended around the steering wheel 47 and frictionally engages the periphery thereof, and is extended therefrom to the cross rod 37. The control wire 48 is crossed over a pulley 49 which is pivotally mounted in the lever 45 just below the steering wheel 47, and then extended over pulleys 50 to either end of the cross rod 37, so that when either side of the steering wheel 47 is moved downwardly, the rudder 38 or steering wheel 36 will be moved to position to turn the machine toward the side of the wheel 47 which is then being moved downwardly.

Control wires 51 are secured to the lower ends of the pylons 42, and wires 53 are secured to the upper ends of the pylons 42 and extended through openings 54 in the body 10, over pulleys 55 to position slightly forward of the lever 45, where they pass around a pulley 56 which is pivotally mounted in the bracket 57 which is fixed to any suitable portion of the body 10.

The control wires 51 from each of the pylons 42 are joined into the common wire 58 adjacent to the lever 45, and the upper portion of the wire 58, as shown in Figure 5, is fastened to the lower end of the lever 45.

From the description of the parts heretofore mentioned, it will be seen that movement of the lever 45 toward the operator has the effect of moving the wire 58 in the direction indicated by the arrow in Figure 5. This effects a dropping or lowering of the rear end of the elevators 41, so that forward progress of the machine over the ground will cause the resistance of the air to exert a lift against the rear end of the fuselage or body 10. The force of this lift may be controlled by the operator by movement of the elevators 41, and is also dependent upon the speed of the machine over the ground.

Rotation of the steering wheel 47 in any of the positions of the lever 45 causes movement of the control wire 48 to swing the rudder 38 and wheel 36 on the axis of the shaft 30, for steering the device, whether the rear end of the body is being supported in the air or upon the ground by the wheel 36.

Between the cabin 23 and the rear end of the body a plane 59, which is preferably made of corrugated aluminum, is pivoted to supports 60 and 61. As shown in Figure 1 there are two of the supports 61 and but one support 60. The support 60 is arranged for vertical adjustment by any suitable means, as by being received in a casting 62 and being provided with a plurality of spaced openings 63 designed to receive a bolt or other fastening means 64. On account of the pivotal movement of the plane 59 on the fittings at the end of the supports or struts 61, the support or strut 60 is somewhat loosely received in the casting 62 to permit the necessary pivotal movement to compensate for the swinging of the plane 59.

A swinging cover member 65 is provided for the cabin 23, as in the preferred form of my fuselage the height between the floor and the ceiling of the cabin would be insufficient to permit the driver or passengers to stand up. For this reason the cover member 65 is provided with a hinge 66 and suitable springs or a counter-balancing weight, so that it will normally yieldingly swing up to an angle of approximately 45 degrees relative to the fuselage or body structure.

Locking means are provided for latching the cover member 65 against the body, and preferably designed to coact with the latch for the cabin doors 67, so that when either door is opened the cover member 65 will swing to its upper position. In Figure 12 I have shown one form of such a latch, wherein the bar 68, turned by movement of the door handle, is provided with an upwardly inclined arm 69. The cover member 65 is provided with a transverse shaft, not shown, having arms 70 at either end, with latch members 71 formed at the bottom thereof. Coacting latching members 72 are formed on the cabin 23, and a spring 73 is designed to yieldingly hold the arms 70 and latch members 71 against the latch members 72. The forward movement of the arms 70, caused by the spring 73, is limited by a stop 74.

The arm 69 is so arranged that when the door handle is revolved to unlatch the door 67, the arm will be moved to release the latch 71 from engagement with the latch 72, thereby releasing the cover member 65 to permit it to swing to its upper position. As the arms 70 are connected to a common transverse shaft, the latch members at both sides of the cabin will be released simultaneously when either door is opened, to thereby permit the cover member to swing upwardly.

When the operator has entered the cabin he may then grasp any convenient part of the cover member 65 to pull it down to position where the latch members will lock it from upward movement.

I preferably provide the cover member 65 with a periscope 75 so that the driver of the vehicle may glance at the periscope to see the road or ground in the rear of the vehicle.

At the forward end of the fuselage, adjacent to the wheels, I provide relatively small planes 76 at either side, which act as mud guards for the wheels and also tend to lift the body or fuselage member.

In the practical operation of my improved device the parts are assembled and arranged as heretofore described. The operator when entering the car, by opening the door at either side releases the cover member 65 so that it may swing to its upper position, and when he and the passengers, if any, have entered, pulls down the cover member to the position shown in the full lines in Figure 3.

The driving mechanism is then operated in the manner which is common to all automotive vehicles, for operating the front wheels 14. As the vehicle gathers speed it will be seen that the horizontal fins 40 and the plane 59 together exert a lift tending to raise the rear end of the body or fuselage off the ground, due to the resistance of the air.

When the machine has attained sufficient speed, the rear end will lift itself clear from the ground, and the entire body may be held in a substantially horizontal position by moving the lever 45 to control the angle of incidence of the elevators 41.

When the rear wheel 36 has been lifted clear of the ground, movement of the rudder 38, together with the resistance of the air due to the forward motion of the machine, enables the operator to steer the machine in a manner similar to that in which an aeroplane is steered.

The strut 60 is adjustable, so that the normal lift of the machine at an average speed may be substantially fixed by the adjustment of the vertical height of the strut 60.

I have so designed my vehicle that approximately ten per cent of the dead load is carried by the planes at the rear of the fuselage, but this proportion may be varied. The greater portion of the live load, it will be noted, will also be carried by the planes when the machine is moving at an average speed, and the adjustment of the plane 59 may be varied to compensate for increased weight of passengers, if desired.

An advantage of the construction of my improved autoplane resides in the fact that a considerable portion of the weight of the machine is carried by the lift exerted on the planes by the air, due to the forward motion of the machine, whereby a considerable percentage of the jars due to irregularities in the road over which the machine is passing, may be eliminated. This is especially true, as only one pair of wheels contact with the road when the machine is traveling at an ordinary rate of speed, so that any irregularity in the surface of the road will cause but a single jar to the machine, whereas with a four-wheeled vehicle the same jar is transmitted to the machine from both pairs of wheels as they pass over the irregularity.

The planes 76 at the forward end of the fuselage tend to carry a predetermined portion of the weight of the body, due to the resistance of the air and its consequent lift, thereby lessening the effect of irregularities in the road which would be imparted to the body from the wheels 14.

The plane 59 also exerts some lift on the front portion of the body or fuselage.

Throughout the machine the stream-line effect which has been found successful in reducing air resistance in building aeroplanes, has been used in order to decrease the resistance of the air to the forward movement of the body of my improved vehicle.

Some changes may be made in the construction and arrangement of the various parts of my device, without departing from the essential features and purposes of my invention, and it is my intention to cover by my claims any modified forms of structure or use of mechanical equivalents which may be reasonably included within their scope.

I claim as my invention:

1. In a vehicle of the class described, a body having front supporting wheels, means for driving said wheels, a steerable rear wheel, a rudder, means for simultaneously operating said rudder and steerable wheel, planes on said vehicle adjacent to said steerable wheel, having adjustable elevator members, carrying planes projecting laterally from the body of said vehicle near the front end thereof and adapted to form mud-guards for the driven wheels, a plane above said body, a rigid support for the forward portion of said last plane, a support for the rearward portion of said last plane adjustable up and down, and means for securing said last support in various positions of its adjustment.

2. In a machine of the class described, a body, front driven wheels for said body, a vertically arranged, rotatably mounted shaft at the rear end of said body, a rudder fixed to said shaft, said shaft being mounted for yielding vertical movement with relation to said body, spring arms projecting downwardly from said shaft, and a wheel supported between said spring arms, means for imparting limited rotation to said shaft for simultaneously steering said wheel and operating said rudder.

Des Moines, Iowa, March 11, 1919,.

RUDOLPH B. ILLGEN.